(12) United States Patent
Balentine

(10) Patent No.: US 8,675,061 B2
(45) Date of Patent: Mar. 18, 2014

(54) DIGITAL VIDEO PROJECTION DISPLAY SYSTEM

(76) Inventor: Richard D. Balentine, Huntington Beach, CA (US)

( * ) Notice: Subject to any disclaimer, the term of this patent is extended or adjusted under 35 U.S.C. 154(b) by 354 days.

(21) Appl. No.: 12/931,392

(22) Filed: Jan. 31, 2011

(65) Prior Publication Data

US 2012/0105636 A1     May 3, 2012

Related U.S. Application Data

(60) Provisional application No. 61/456,102, filed on Nov. 1, 2010.

(51) Int. Cl.
H04N 7/00 (2011.01)
H04N 7/18 (2006.01)

(52) U.S. Cl.
USPC ........... 348/115; 348/113; 348/143; 348/148; 359/377; 359/460; 359/599; 345/691; 353/100; 600/173

(58) Field of Classification Search
USPC ........... 359/377, 460, 599; 345/691; 353/100; 600/173; 348/113, 115, 143, 148
See application file for complete search history.

(56) References Cited

U.S. PATENT DOCUMENTS

| | | | |
|---|---|---|---|
| 5,636,912 A | 6/1997 | Lee et al. | |
| 6,195,206 B1 | 2/2001 | Yona et al. | |
| 6,306,082 B1 * | 10/2001 | Takahashi et al. | 600/173 |
| 6,829,086 B1 | 12/2004 | Gibilini | |
| 7,110,184 B1 | 9/2006 | Yona et al. | |
| 7,683,875 B2 | 3/2010 | Kubo | |
| 2002/0176058 A1 * | 11/2002 | Yasui et al. | 353/100 |
| 2003/0058373 A1 | 3/2003 | Roest et al. | |
| 2005/0105186 A1 * | 5/2005 | Kaminsky et al. | 359/599 |
| 2005/0174637 A1 * | 8/2005 | Stulens | 359/460 |
| 2006/0215244 A1 | 9/2006 | Yosha et al. | |
| 2007/0121203 A1 * | 5/2007 | Riederer | 359/377 |
| 2007/0146593 A1 | 6/2007 | Ino | |
| 2009/0278869 A1 * | 11/2009 | Oishi et al. | 345/691 |

* cited by examiner

Primary Examiner — Geepy Pe
(74) Attorney, Agent, or Firm — Plager Schack, LLP

(57) ABSTRACT

A biocular display system is provided for use with a transmissive micro-LCD display and a biocular lens, where the biocular system includes a relay lens that can transfer a digital image from the transmissive micro-LCD display to a micro-resolution screen surface where a micro-diffusion surface is applied to a single planar transparent substrate that has a smooth surface on a side opposite the micro-diffusion surface, and the micro-diffusion surface has at least some surface features that can diffuse the light passing therethrough at greater than a 60-degree diffusion angle.

3 Claims, 10 Drawing Sheets

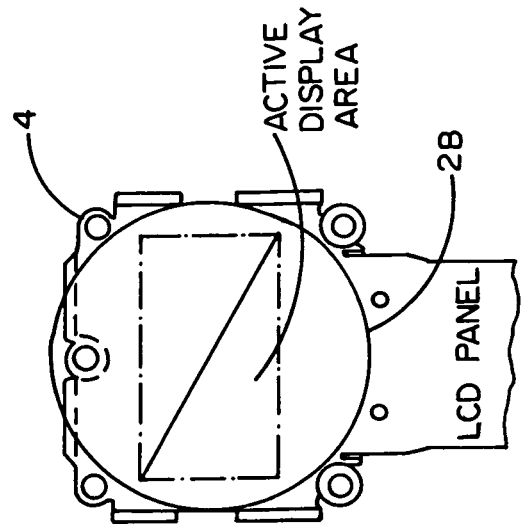
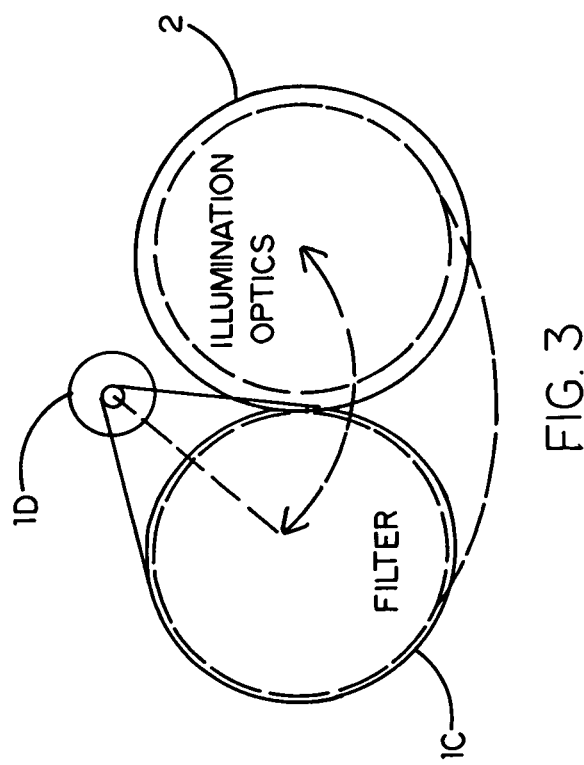
FIG. 4
FIG. 3

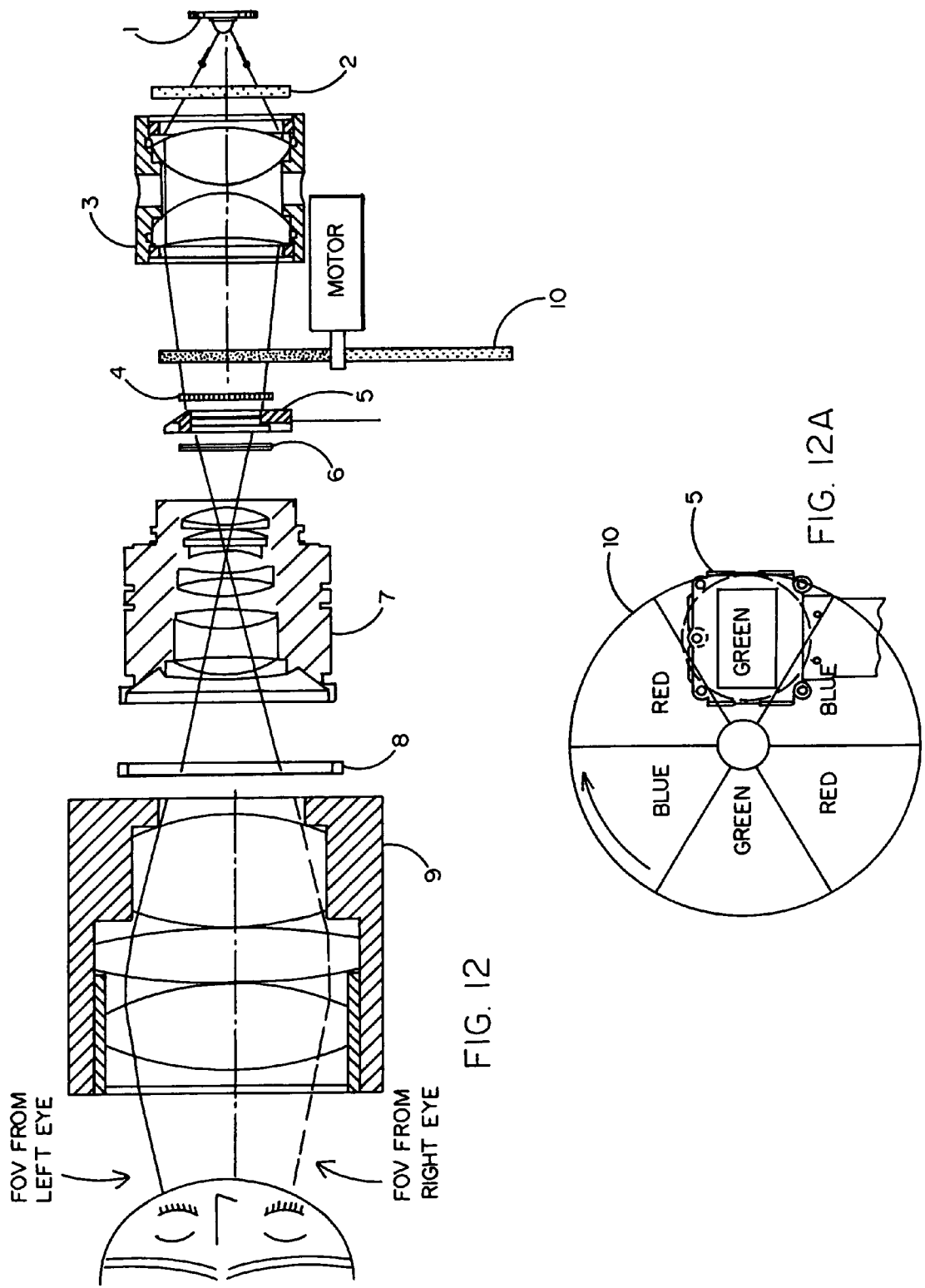

DIGITAL VIDEO PROJECTION DISPLAY SYSTEM

CORRESPONDING PATENT APPLICATIONS

The present application takes priority from provisional application Ser. No. 61/456,102 filed Nov. 1, 2010.

BACKGROUND OF THE INVENTION

1. Field of the Invention

The present invention relates to systems for displaying a video image through a viewing lens. The preferred embodiment uses illumination optics to focus light through an electronic imaging device such as an LCD display. A relay lens projects an image on a micro-resolution screen surface creating an image plane on which a viewing lens is focused and may alter the size of the image for viewing purposes.

2. Background Discussion

Previous related designs utilize CRT technology with or without a fiber optics faceplate and a biocular lens in close proximity to and focused on an image plane. This technology has disadvantages in that the manufacturing method is expensive and replacement cost is high. CRT's are sensitive to vibration, resolution is limited, contrast ratios are generally low and power consumption is relatively high. Moreover, CRT disposal poses certain environmental risks which have become increasingly objectionable in today's "green minded" society. Furthermore, current technology cannot provide zoom or contrast control capability and maintenance costs are increasing.

There are some remotely relevant prior art patents and published patent applications which disclose one or more components that may be employed in an embodiment of the present invention. By way of example, Patent Application No. 2007/0146593 published Jun. 28, 2007 to Ino relates to an LCD display wherein each pixel element has a reflection element and a transmission element. Patent Application 2003/0058373 published Mar. 27, 2003 to Roest et al describes an LCD projection device which employs a look-up table to derive a control signal for each pixel of the LCD matrix based on a corresponding image signal. Patent Application 2006/0215244 published Sep. 28, 2006 to Yosha et al discloses a system for a vehicle operator that includes an optical assembly receiving the incident image and creating a collimated beam and an optical module in an operator's line of sight and displaying decoupled images with infinite focal point. U.S. Pat. No. 6,829,086 issued Dec. 7, 2004 to Gibilini discloses a rear projection screen that uses micro-lenses and a holographic diffuser on a spacer layer. U.S. Pat. No. 7,110,184 issued Sep. 19, 2006 to Yona et at shows an image combiner (scene and induced images) that uses a diffusive surface located between a display screen and eyepiece optics. U.S. Pat. No. 6,195,206 issued Feb. 27, 2001 to Yona et al shows a helmet-mounted display wherein the embodiment of FIG. 13b uses an LCD. U.S. Pat. No. 7,683,875 issued Mar. 23, 2010 to Kubo discloses a high definition capable LCD display. U.S. Pat. No. 5,636,912 issued Jun. 10, 1997 to Lee et at discloses an LCD-based projection system. But, no prior art known to the inventor herein discloses the same combination of components.

SUMMARY OF THE INVENTION

The invention herein comprises a viewing lens-based digital display to view images generated by a remote video camera or other digital source.

An LED is used for backlighting illumination purposes when an LCD is used. Light collected by a lens is focused and passed through one polarizer filter and is focused through a transmissive LCD display comprising an array of pixels of which each may be fitted with a micro lens.

The light is passed through the LCD, then through a second polarizer filter. A relay lens may alter the size of the image and transfers the image to a micro-resolution screen surface whose surface features are preferably under 0.5 microns in size. The micro-resolution screen surface acts as a rear projection screen. The micro-resolution screen surface achieves near Lambertian illumination across the image plane. The feature size of the diffuser is also important in that when the image forms on the surface, the physical features making up the surface are smaller than the projected pixel size or contrast/resolution suffers.

The relay lens is either of a fixed focal length or a zoom lens, which provides additional zoom capability to the system. The relay lens can use a remotely adjustable iris to improve image contrast.

A first color option is available using a color mixing cube to align three primary color images from three LCD devices projected onto a unitary micro-resolution screen surface. In this case red, green and blue LED's and narrow band pass filters are utilized for illumination.

A second color option may instead use a three color spinning circular filter placed between the illumination source and the digital device.

A color filter option or selectable color LEDs, allow user selectable monochromatic color to be superimposed through the illumination system for example making it compatible with night vision requirements.

A viewing lens is designed to focus on the micro-resolution screen. It projects the image for viewing. The viewing lens can be biocular, monocular, binocular or any other lens configuration suitable to the application. The preferred embodiment may use a biocular lens to keep the images stable regardless of viewer motion The present invention appears to be highly advantageous for use particularly in military targeting because of these features:

Low cost
Low maintenance
Optical zoom function
Optical contrast control
Digital contrast/brightness/gamma control
Smaller package design
Lower power usage
No environmental disposal problems (as with a CRT)
Digital full color option
Monochromatic filter option with no added space requirements
Improved vibration ruggedness
Can be used with many available biocular lenses
No D/A converter is required

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 3 illustrates a retractable filter used in the embodiment of FIG. 1;

FIG. 4 is a plan view of a transmissive digital display of the invention;

FIGS. 12 and 12A illustrate an alternative color embodiment which uses a spinning color wheel having three separate primary colors.

DETAILED DESCRIPTION OF PREFERRED EMBODIMENTS

The present invention may use a backlighted transmissive LCD display receiving a video image from a remote video camera.

Figure 1:
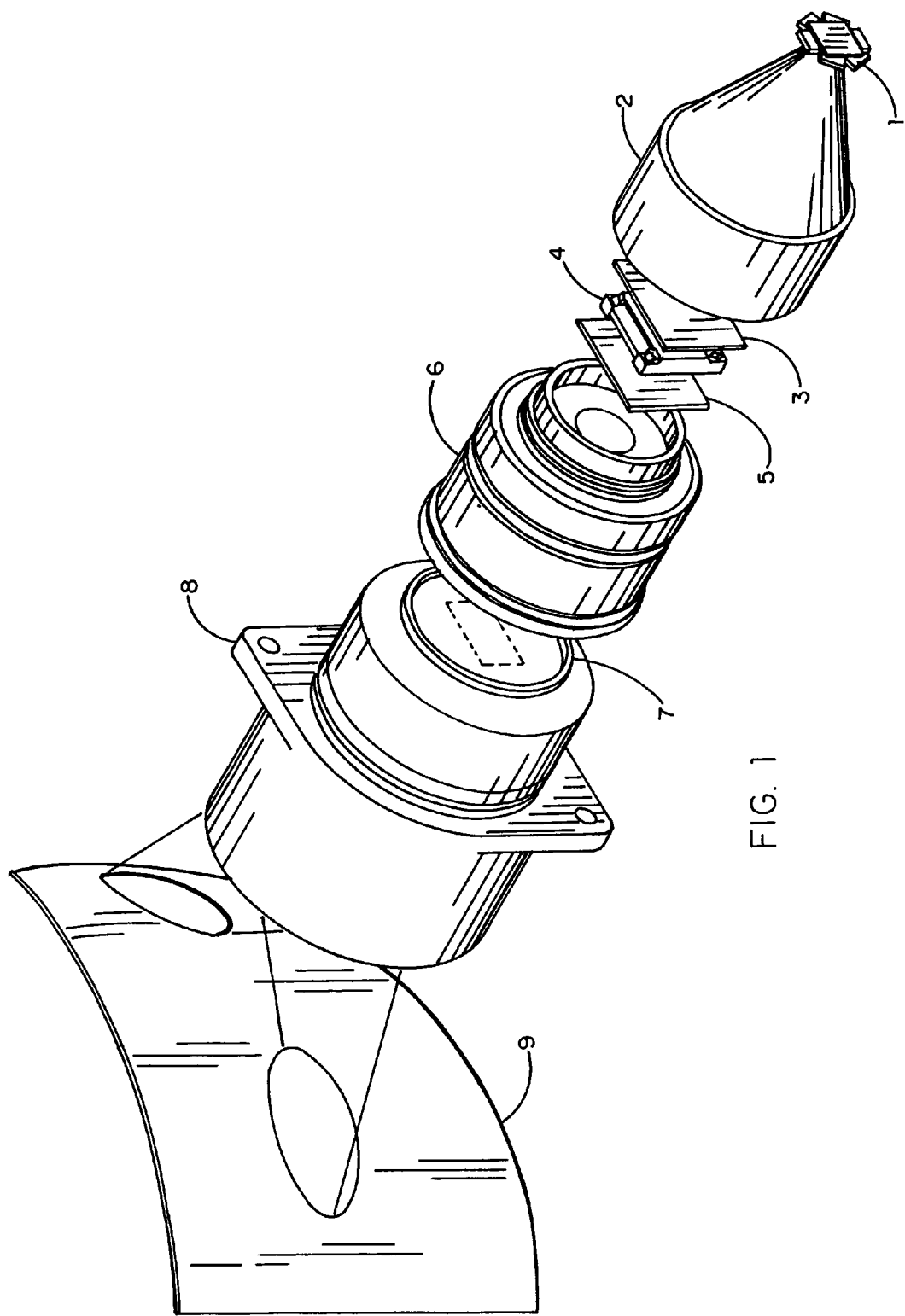
FIG. 1 is a three-dimensional layout view of the optical components of a preferred embodiment.
Figure 2:
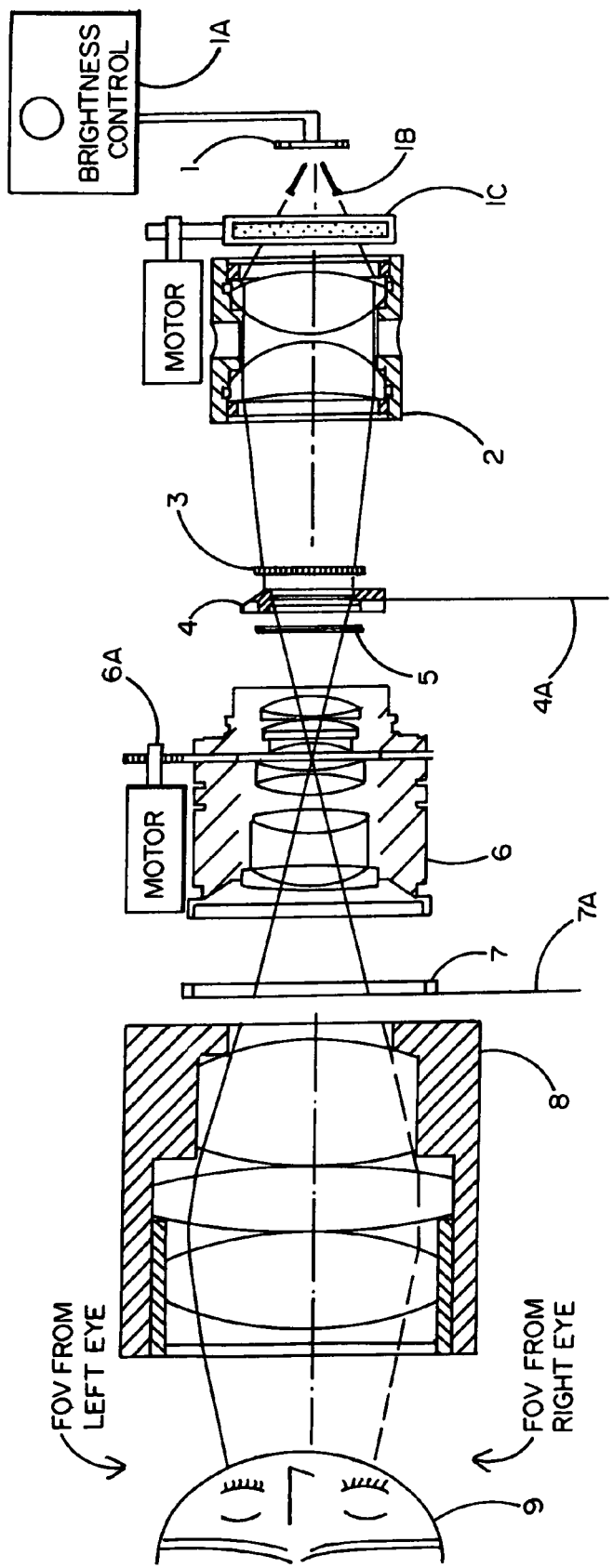
FIG. 2 is a schematic diagram of the optical system of FIG. 1.

The backlight comprises a white light illumination source 1 (see FIG. 1) of which brightness is controlled by the user by control means 1a (see FIG. 2). The illumination device has a lens which directs a majority of the light in a controlled diverging conical shape 1b.

Figure 5:
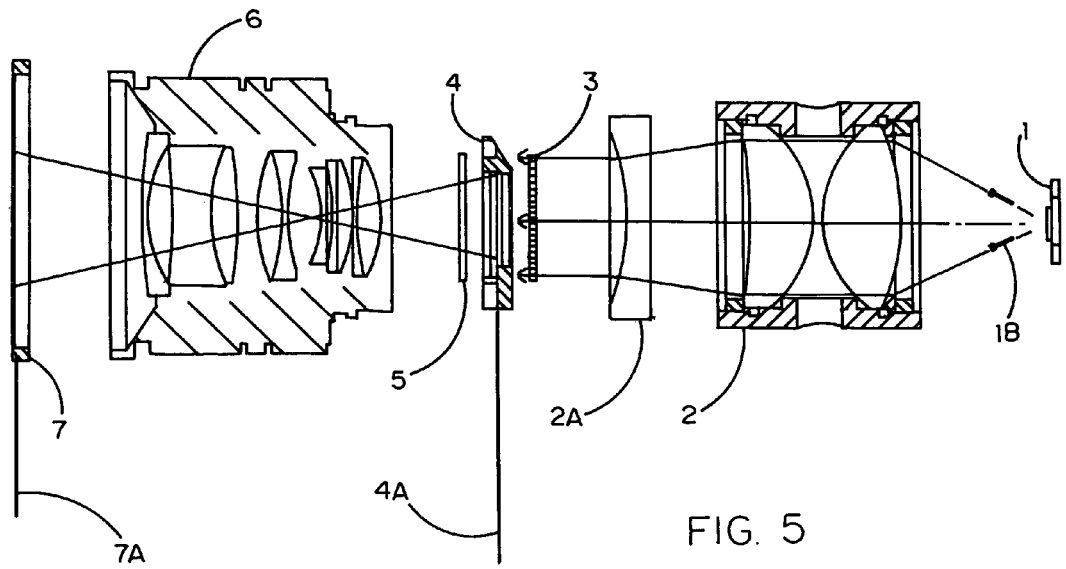
FIG. 5 is a schematic diagram showing an optical collimator illumination lens.
Figure 6:
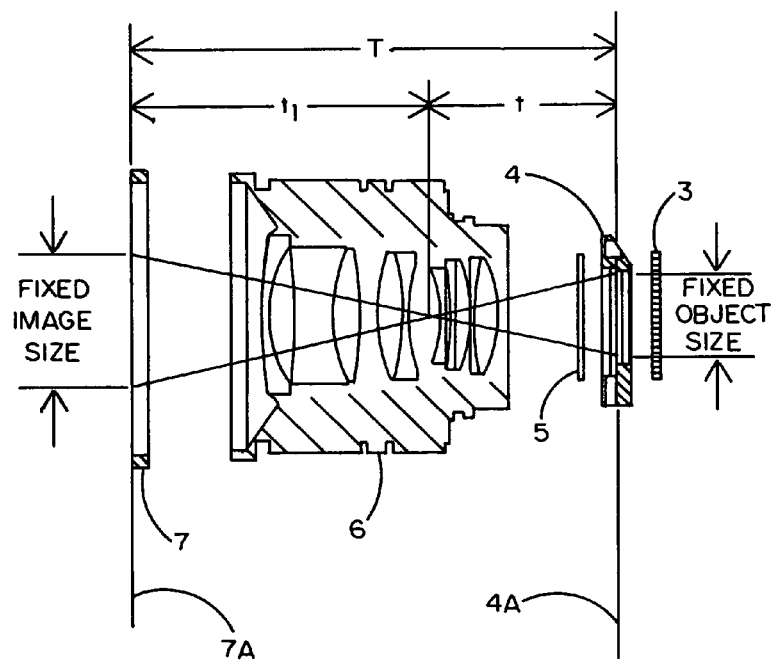
FIG. 6 is a schematic diagram of a fixed focal length relay lens positioned between a digital image device and a micro-resolution screen surface of one disclosed embodiment.

In the exemplary embodiment shown herein by way of illustration, the light passes through a retractable filter 1c (see FIG. 3), which is controlled by the user using an electronic switch that activates a motor 1d. The illumination cone is captured by the aperture of a lens system 2 which refocuses the light into a converging conical beam. Additional optics 2a (see FIG. 5) can be added to collimate the illumination light. The illumination beam passes through a polarizer filter 3. The illumination light is shaped in a circular fashion to be slightly larger then the diagonal size 2b (see FIG. 4) of the image source and focused through the image object plane 4a (see FIG. 2).

The LCD image device 4 produces images at a selected resolution although other resolutions within the same package can be achieved depending upon the digital device that is chosen. In one preferred embodiment, the resolution may be what is referred to as high definition which is at least 1920× 1080 pixels. For purposes of simplification, the video signal input to the LCD image device, is omitted in the drawings. The illumination light passes through a second polarizer 5.

A relay lens system 6 is designed to transfer an image from the object plane 4a to the image plane 7a at a magnification ratio that matches the desired field of view (FOV) of the biocular lens 8 being used. The lens system 6 is defined by choice of packaging requirements and optional capabilities. A fixed focal length lens system (see FIG. 5) is used when a zoom function is not required. A number of lens focal lengths and distances between the image and the object are listed in Table 1 and Table 2 as defined in FIG. 7. Tables 1 and 2 define general working distances based on practical magnification ratios used to fit the FOV of a viewing lens 8. The magnification ratio range in the disclosed embodiment may be between 1.4:1 and 6:1, but can be increased or decreased within the practical physical working limits of the given lens system. An iris (aperture stop) 6a (see FIG. 2) can be designed to be controlled by the operator by external control and activated by motorized means. The closing of the iris results in a reduction of illumination on the image plane but increases contrast and depth of focus resulting in a sharper image. The iris is an optional component that increases the image quality, but is not necessary for the operation of the invention.

Figure 7:
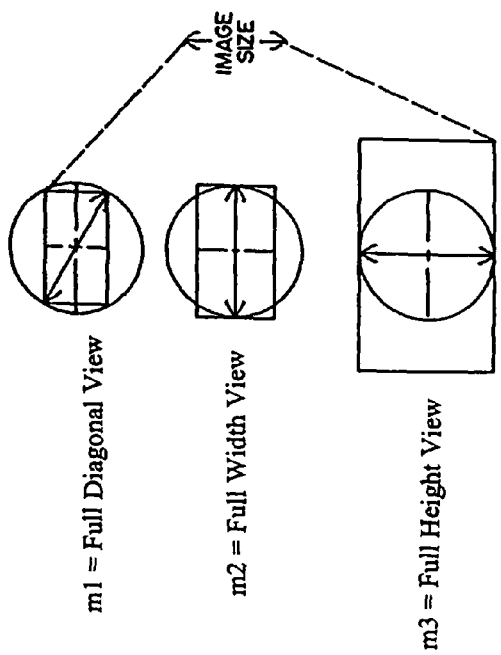
FIG. 7 illustrates calculation of magnification and image sizes for fixed focal length lenses in the lens system of FIG. 6.
Figure 8:
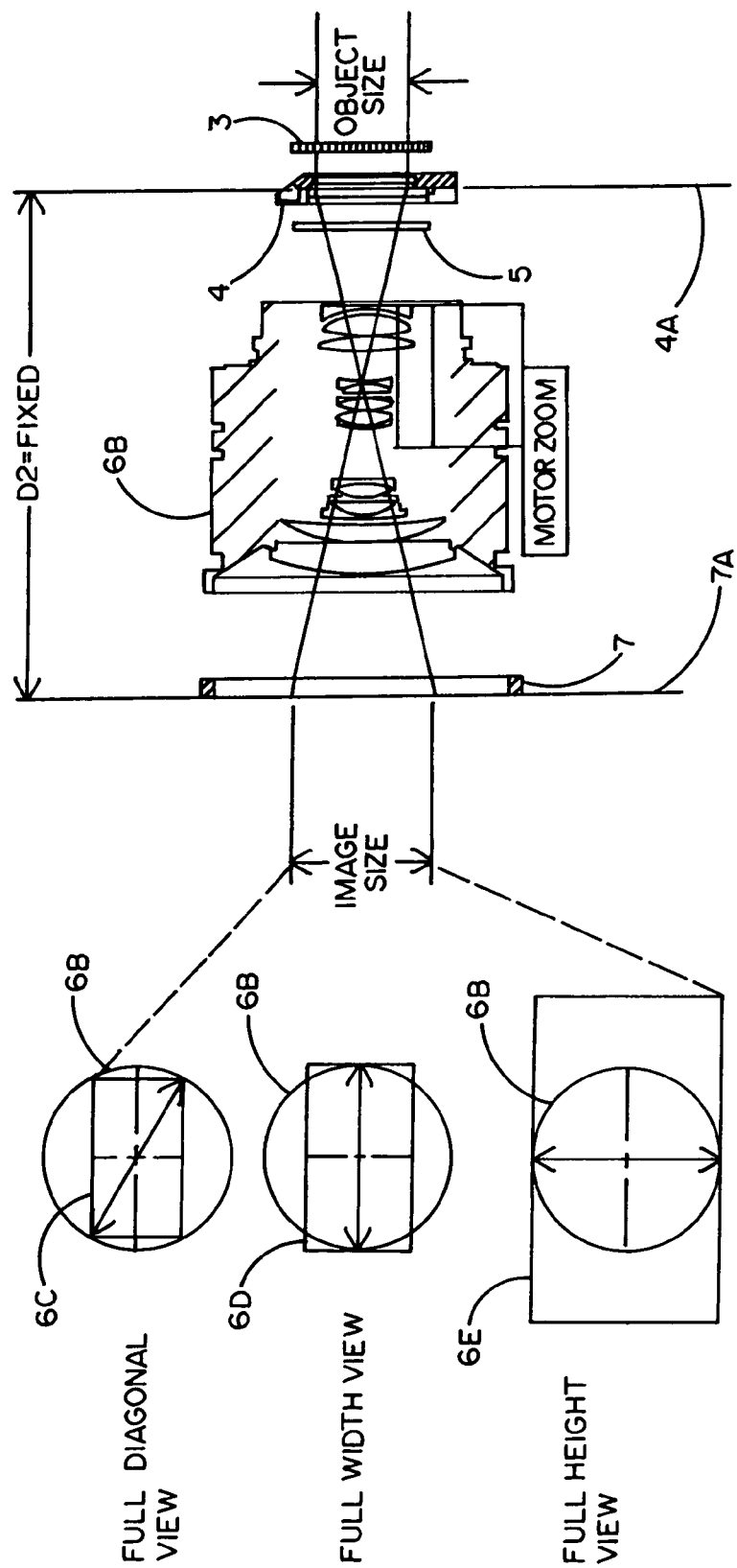
FIG. 8 illustrates image size variation for a motorized zoom function in a relay lens.

In an optional operator-controlled zoom lens shown in FIG. 8, the lens system 6b is designed to provide similar magnification ratios as described with the fixed focal length lenses of FIG. 7. The object plane 4a and image plane 7a remain stationary. The internal optical components are separated by motorized mechanical means to form a variable magnified image of the fixed object onto the image plane 7a.

Figure 9:
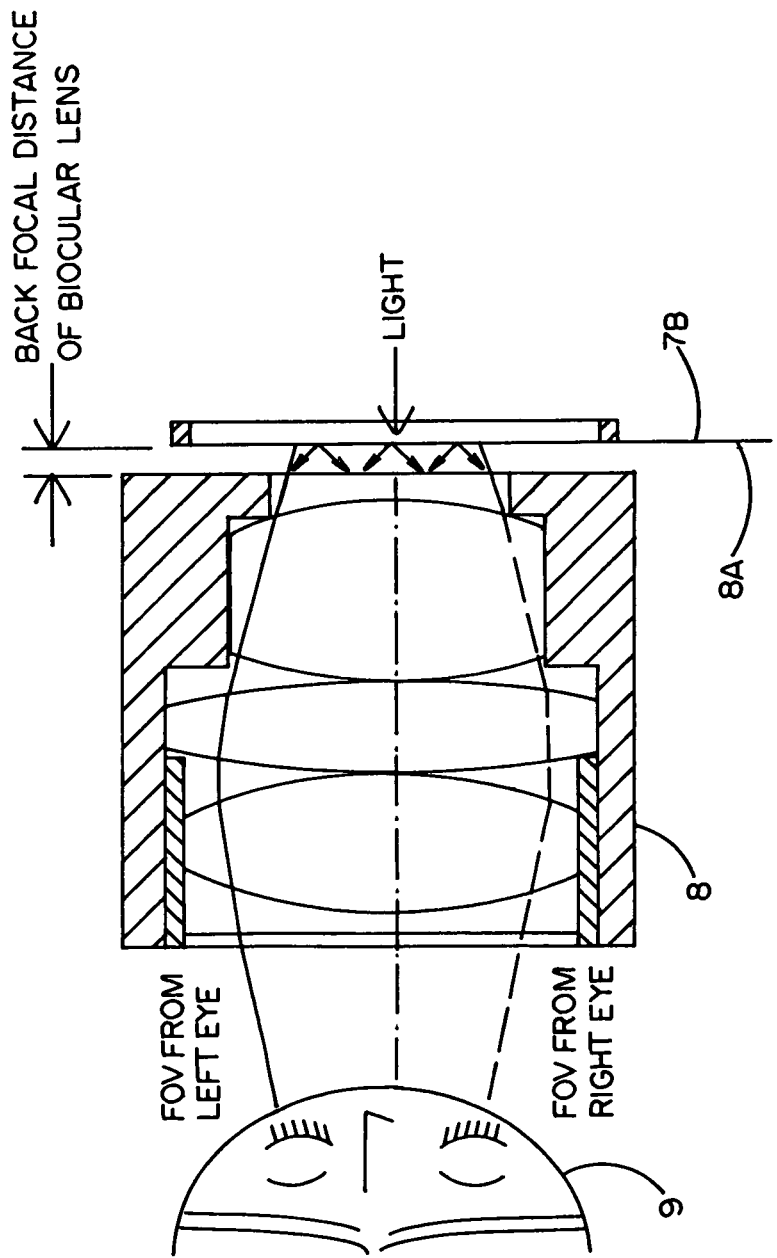
FIG. 9 is a more detailed view of the viewing lens and micro-resolution screen surface interface.
Figure 10:
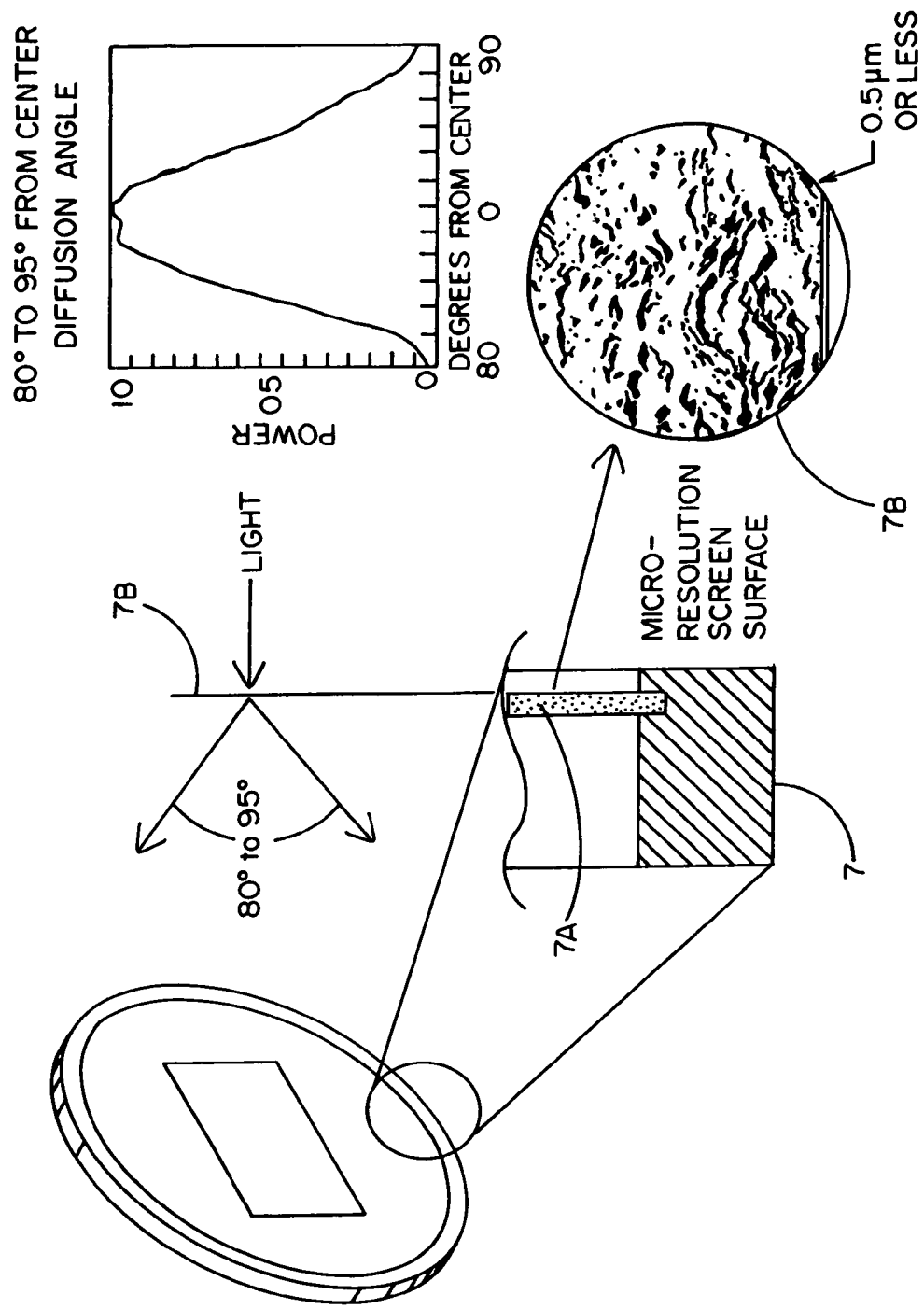
FIG. 10 illustrates an example of the characteristics of a micro-resolution screen surface used in the preferred embodiment.
Figure 11:
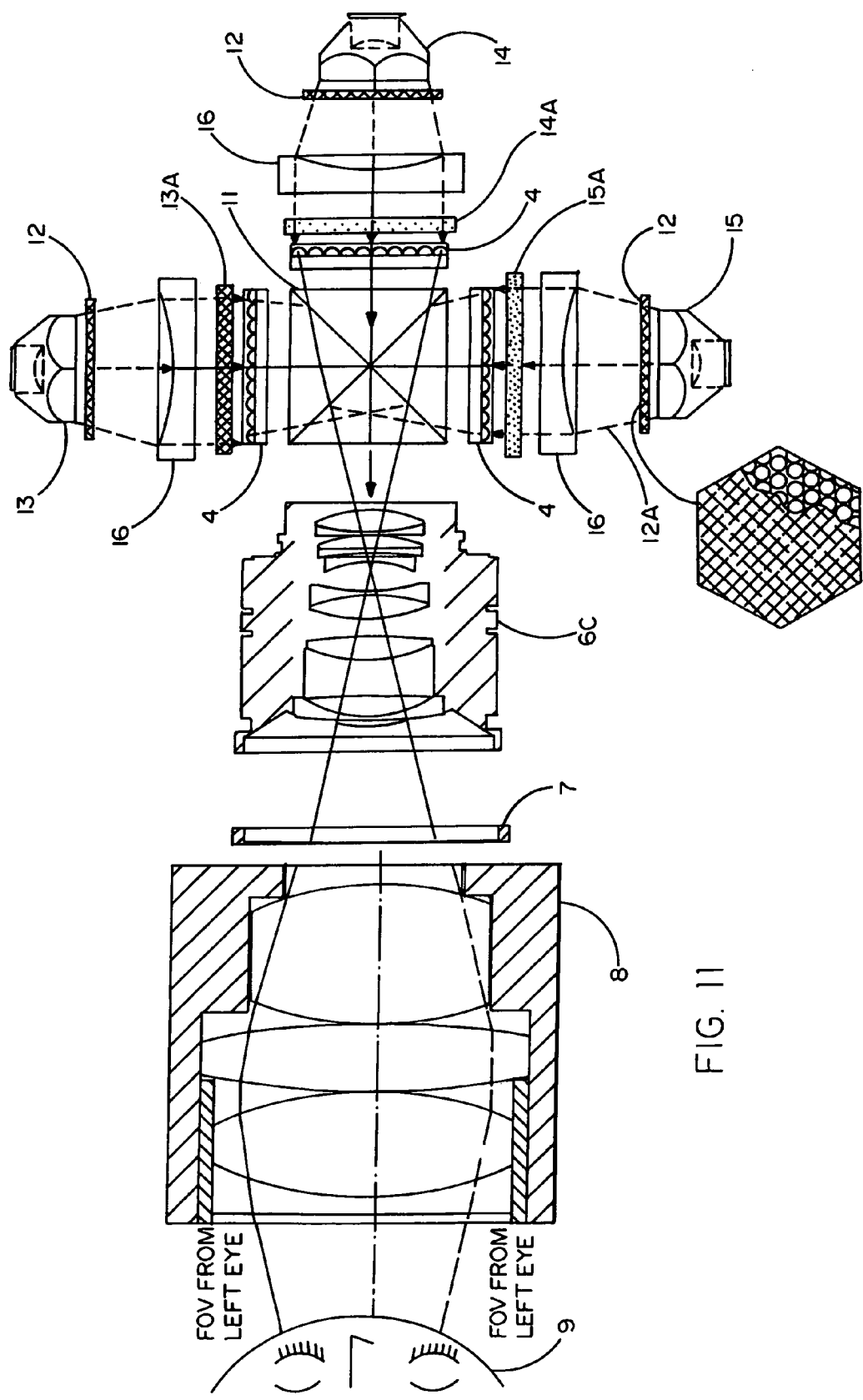
FIG. 11 is a schematic diagram of a multi-color version of the invention.

A first color option shown in FIG. 11 is provided using a color mixing cube 11 to align three separate LCD image displays 4 of identical make, representing red, green and blue colors. The lens 6c is designed to view the three displays at a common back focal distance and project an image onto the image plane 7a which is contiguous with the back focal plane 8a (which is contiguous with 7b) of the biocular lens (see FIG. 9). Illumination sources are chosen with the representative color spectral outputs of red 13, green 14 and blue 15. In addition, narrow band pass filters of red 13a, green 14a and blue 15a can be used to block unwanted residual spectral output. A light collector device is used to collimate the illumination light very close to the source. Each separate color then passes through a holographic diffuser 12 that acts to both diffuse the light and to closely define the diverging illumination beam angle. Respective corrective lenses 16 are used to then collimate the illumination beam through each LCD display.

A second color option is shown in FIGS. 12 and 12A. In this alternative color method, a thin color wheel 10 is introduced between the illumination source and the LCD module.

The color wheel is composed of three separate primary colors, namely red, green and blue. The color can be derived by either using color transparent material or depositing a specific coating on the surface of a transparent material. Each color segment is equal to the others in size.

The color wheel revolves on a shaft offset from the axis of the LCD. The wheel rotates by motorized means.

The system operates by spinning the color wheel at three times the normal frame rate of the LCD. Electronics drive the LCD at three times the normal rate. The video signal is divided into the three primary colors (RGB) whose active field is in synchronization with the corresponding color on the color wheel.

The speed at which the wheel spins and frame rate of sequential red, green and blue images are projected so that the human eye cannot perceive the transition between colors and only sees what appears to be color video imagery projected through the single transmissive LCD.

The image is projected on a micro-resolution screen surface that acts as a rear projection screen 7 made up of a transparent substrate 7a, which is smooth on one side and has micro-diffusion surface 7b on the other side, which diffuses the light passing through at greater than a 60-degree diffusion angle resulting in near Lambertian illumination. Such a screen can be derived from but is not limited to any of several means or a combination of any of the these, namely: a) chemical etching, b) abrasive degradation of a surface, c) by holographic means, d) by fine pigment paint, e) by sub-micron particles distributed on a transparent surface 7. For example, a holographic diffuser has the advantage of a very defined and controlled diffusion angle and is precisely reproducible. The micro-resolution screen surface should have a structure with each surface feature acting as a light scattering object. The micro-resolution screen surface is non-wavelength dependent and can work with white, monochromatic, coherent or incoherent light. The surface structure works with both collimated and un-collimated light and most importantly, eliminates Moiré' effect and color diffraction.

A viewing lens 8 is used to project the image which can be viewed by the user 9 with a focus at apparent infinity. The back focal plane 8a, which is contiguous with the image plane 7a, is very close to the exit pupil of the viewing lens ensuring that all of the image illumination is captured from the wide diffusion angle of the micro-resolution screen surface.

Having thus disclosed preferred embodiments of the invention herein, it will be evident that the invention is characterized by the scope of the appended exemplary claims and not by the specific features hereof which are merely illustrative of particular embodiments.

I claim:

1. A biocular projection system configured to project digital images fed to a transmissive micro-LCD display at resolutions as high as 1920×1080 pixels, the biocular projection system configured to be used with both a micro-LCD display and a biocular lens, the biocular projection system comprising:

a micro-resolution screen comprising a micro-diffusion surface applied to a single planar transparent substrate that has a smooth surface on a side opposite the micro-diffusion surface, the micro-diffusion surface comprising surface features configured to diffuse the light passing therethrough at greater than a 60-degree diffusion angle; and a relay lens assembly comprising a plurality of lenses configured to transfer digital images from a transmissive micro-LCD display to the micro-resolution screen surface at a magnification ratio corresponding to the desired field of view of a corresponding biocular lens with which the biocular projection system is intended to be used, whereby when the biocular projection system is used with both a micro-LCD display and a biocular lens, the biocular projection system can be used to effectively project such digital images with minimal loss of resolution quality even where the viewer is in very close proximity to the micro-LCD display and a wide viewing angle is desired without compromising illumination when used with varying binocular lenses.

2. The biocular display system of claim 1, wherein said relay lens is configured to alter the size of the digital image projected onto the micro-resolution screen surface.

3. The biocular display system of claim 1, wherein the micro-diffusion surface comprises a random array of features less than 0.5 microns in size.

* * * * *